(12) United States Patent
Fujiya et al.

(10) Patent No.: US 8,283,067 B2
(45) Date of Patent: Oct. 9, 2012

(54) ELECTRIC ENERGY STORAGE DEVICE AND MANUFACTURING METHOD THEREOF

(75) Inventors: Naoko Fujiya, Yonezawa (JP); Shinichi Konno, Yonezawa (JP); Kazunori Ozawa, Tokyo (JP)

(73) Assignee: Enax, Inc., Tokyo (JP)

( * ) Notice: Subject to any disclaimer, the term of this patent is extended or adjusted under 35 U.S.C. 154(b) by 382 days.

(21) Appl. No.: 12/664,564

(22) PCT Filed: Jul. 20, 2007

(86) PCT No.: PCT/JP2007/064372
§ 371 (c)(1),
(2), (4) Date: Dec. 14, 2009

(87) PCT Pub. No.: WO2009/013796
PCT Pub. Date: Jan. 29, 2009

(65) Prior Publication Data
US 2010/0173194 A1 Jul. 8, 2010

(51) Int. Cl.
*H01M 2/30* (2006.01)
(52) U.S. Cl. .................. 429/178; 429/179; 429/211
(58) Field of Classification Search .............. 429/178, 429/211, 179
See application file for complete search history.

(56) References Cited

U.S. PATENT DOCUMENTS

| | | | | |
|---|---|---|---|---|
| 6,132,900 A | * | 10/2000 | Yoshizawa et al. | 429/185 |
| 7,754,379 B2 | * | 7/2010 | Oogami et al. | 429/178 |
| 7,763,377 B2 | * | 7/2010 | Kozuki | 429/122 |
| 2004/0224227 A1 | * | 11/2004 | Ozawa et al. | 429/211 |

FOREIGN PATENT DOCUMENTS

| | | |
|---|---|---|
| EP | 1 202 360 A1 | 5/2002 |
| EP | 1 475 852 A1 | 11/2004 |
| JP | 2002-324541 | * 11/2002 |
| JP | 2002-324541 A | 11/2002 |
| JP | 2003-151529 A | 5/2003 |
| JP | 2003-331819 A | 11/2003 |

* cited by examiner

*Primary Examiner* — John S Maples
(74) *Attorney, Agent, or Firm* — Birch, Stewart, Kolasch & Birch, LLP

(57) ABSTRACT

There is provided an electric energy storage device which has a connection structure with a high connection reliability and which can suppress any contact of an outer package body with a connection terminal with a simple structure. The electric energy storage device comprises a battery element 10 retained in an outer package body 20 having a metal layer 21b, a tabular internal lead 31 connected to the battery element 10, a tabular external lead 32, a connection terminal 33 electrically connecting the internal lead 31 with the external lead 32, an internal insulating member 41, and an external insulating member 43. Flanges 33T, 33B at both ends of the connection terminal 33 depress the external insulating member 43, the outer package body 20, and the internal insulating member 41 between the tabular external lead 32 and internal lead 31, and the external insulating member 43 and/or internal insulating member 41 is pressed in between a penetration shaft 33S of the connection terminal 33 and the metal layer 21b.

18 Claims, 5 Drawing Sheets

ELECTRIC ENERGY STORAGE DEVICE AND MANUFACTURING METHOD THEREOF

This application claims priority from PCT/JP2007/064372, filed 20 Jul. 2007

TECHNICAL FIELD

The present invention relates to an electric energy storage device, such as a lithium ion secondary battery, a lithium secondary battery, a polymer secondary battery, or an electric double-layer capacitor.

BACKGROUND ART

Conventionally, regarding electric energy storage devices like a lithium ion secondary battery, reduction in size and in weight, thinning and a degree of freedom of shape become highly requisite in accordance with expansion of its various applications.

In response to such requisites, there is proposed a sheet-like lithium ion secondary battery which is lightweight, thin, and flexible and which has a flexible outer package body as a battery case comprising a multilayered laminated film including an internal layer formed of a thermoplastic resin with good electrolysis-solution tolerability and heat seal characteristics, such as polyethylene or polypropylene, a middle layer formed of a metal foil with good flexibility and strength like an aluminum foil, and an external layer formed of an insulating resin with a good electrical insulation property like polyamide, and wherein a sheet-like internal electrode pair and an electrolysis solution are filled in the outer package body (see, for example, patent literatures 1 and 2).

Patent literature 1 discloses a sheet-like secondary battery comprising an internal electrode pair including a sheet-like positive electrode, a separator, and a sheet-like negative electrode all stacked together, an outer package body retaining the internal electrode pair thereinside, an internal lead connected to the internal electrode pair, an external lead sandwiching the outer package body and arranged outwardly thereof, and connection means for electrically connecting the internal lead and the external lead together by airtightly passing all the way through the outer package body, and the outer package body is firmly and airtightly held between the internal lead and the external lead to improve the sealing property and the connection reliability.

Patent literature 2 discloses a secondary battery comprising an electrode body with a protrusion, and an outer package body covering and wrapping the electrode body, the protrusion passes all the way through the outer package body and protrudes to the exterior of the battery, a sealing member is provided around the protrusion, and an insulating material is provided at a portion where the protrusion contacts the outer package body. More specifically, after a protrusion 41 is allowed to protrude from an outer package film 3, a sealing member 5 which seals a space between the protrusion and the outer package film is provided around the entire periphery of the protrusion 41, thereby suppressing any short-circuiting as the protrusion 41 contacts a metal foil of the outer package film 3 when the protrusion 41 of an external terminal 4 passes all the way through the outer package film 3

Patent Literature 1: JP2003-151529A
Patent Literature 2: JP2003-331819A

DISCLOSURE OF INVENTION

Problem to be Solved by the Invention

According to the secondary batteries disclosed in patent literatures 1 and 2, however, following problems may occur.

For example, according to the secondary battery disclosed in patent literature 1, because the through-hole of the outer package body 2 and the rivet shaft diameter of the rivet 7a are substantially same, a dielectric breakdown occurs between the outer package body 2 and the rivet shaft of the rivet 7a in accordance with recent usage under a high voltage, and as a result, a middle layer 2b formed of an aluminum foil and the rivet shaft of the rivet 7a may be short-circuited.

Moreover, according to the secondary battery disclosed in patent literature 2, because the metallic protrusion 41 is sealed by a nut and a resin which are separate parts, there is a problem in the long-term sealing reliability. Furthermore, it is necessary to provide the sealing member 5 (insulating material) which is a separate part for each protrusion 41, so that the number of parts and the number of work processes increase, resulting in a cost increase and a problem in the workability.

The present invention has been made in view of the foregoing problems of the conventional technologies, and it is an object of the present invention to provide an electric energy storage device which has a connection structure with a good connection reliability, and which can suppress any contact of a connection terminal with an outer package body with a simple structure.

Means for Solving the Problem

To achieve the object, an electric energy storage device set forth in claim 1 comprises: a battery element retained in an outer package body having at least a metal layer; a tabular internal lead connected to the battery element in the outer package body; a tabular external lead arranged outside the outer package body so as to face the internal lead; a connection terminal electrically connecting the internal lead and the external lead together; an internal insulating member provided between the outer package body and the internal lead along an internal surface of the outer package body; and an external insulating member provided between the outer package body and the external lead along an external surface of the outer package body so as to face the internal insulating member, and wherein the connection terminal includes a penetration shaft passing all the way through the external lead, the external insulating member, the outer package body, the internal insulating member, and the internal lead, and flanges integrally formed at both ends of the penetration shaft, the flanges at both ends of the connection terminal depress and sandwich the external insulating member, the outer package body, and the internal insulating member between the tabular external lead and internal lead, and the external insulating member and/or the internal insulating member is pressed in between the penetration shaft of the connection terminal and the metal layer of the outer package body.

Note that the flange integrally formed means a part integrally and continuously formed with an end portion of the metallic penetration shaft, formed of the same material as that of the penetration shaft, and formed in a flanged shape having a larger cross-section than the cross-section of the penetration shaft in the radial direction.

The electric energy storage device set forth in claim 2 has a structure according to claim 1, and wherein respective through-holes of the external insulating member and the internal insulating member through which the penetration shaft of the connection terminal passes are so formed as to have a substantially equal diameter to a diameter of the penetration shaft, and a through-hole of the outer package body through which the penetration shaft of the connection terminal passes is so formed as to have a larger diameter than the diameter of the penetration shaft beforehand.

The electric energy storage device set forth in claim 3 has a structure according to claim 1 or 2, and wherein the outer package body is a multilayered outer package body further having an internal layer formed of a thermoplastic resin which can be heat-sealed, and the internal insulating member also functions as internal-layer protecting means for suppressing any damage of the internal layer of the multilayered outer package body as the internal insulating member covers at least a part of any one of the battery element, the internal lead, and the connection terminal.

The electric energy storage device set forth in claim 4 has a structure according to claim 3, and wherein the internal insulating member covers an end portion of the internal lead in the vicinity of the internal layer of the multilayered outer package body across a lengthwise direction of the internal lead.

The electric energy storage device set forth in claim 5 has a structure according to claim 3 or 4, and wherein the internal insulating member covers the flange of the connection terminal in the vicinity of the internal layer of the multilayered outer package body.

The electric energy storage device set forth in claim 6 has a structure according to any one of claims 3 to 5, and wherein the internal insulating member has a cross-section formed in a rectangular shape without one side, and the rectangle without one side includes a part along the internal layer of the multilayered outer package body, a part covering the end portion of the internal lead, and a part covering the flange of the connection terminal.

The electric energy storage device set forth in claim 7 has a structure according to any one of claims 1 to 6, and wherein a plurality of connection terminals are provided for each of the tabular external lead and internal lead.

The electric energy storage device set forth in claim 8 has a structure according to any one of claims 1 to 7, and wherein the connection terminal is a rivet joined to each of the tabular external lead and internal lead.

The electric energy storage device set forth in claim 9 has a structure according to any one of claims 1 to 8, and wherein the connection terminal is formed of a same material as a material of at least the internal lead.

The electric energy storage device set forth in claim 10 has a structure according to any one of claims 1 to 9, and wherein the internal insulating member is formed of polypropylene, polyethylene, polystyrene, polyamide or ionomer having a higher melting point than a melting point of the internal layer which can be heat-sealed.

The electric energy storage device set forth in claim 11 has a structure according to any one of claims 1 to 10, and wherein the electric energy storage device is a lithium ion secondary battery used under a high voltage larger than or equal to 100 V.

A manufacturing method of an electric energy storage device set forth in claim 12 manufactures the electric energy storage device that comprises a battery element retained in an outer package body having at least a metal layer, a tabular internal lead connected to the battery element in the outer package body, a tabular external lead arranged outside the outer package body so as to face the internal lead, a connection terminal electrically connecting the internal lead and the external lead together, an internal insulating member provided between the outer package body and the internal lead along an internal surface of the outer package body, and an external insulating member provided between the outer package body and the external lead along an external surface of the outer package body so as to face the internal insulating member, the manufacturing method comprises: preparing a connection terminal including a penetration shaft and a flange formed at one end of the penetration shaft beforehand; forming respective through-holes of the external lead, the external insulating member, the internal insulating member, and the internal lead through which the penetration shaft of the connection terminal passes so as to have a substantially equal diameter to a diameter of the penetration shaft; forming a through-hole of the outer package body through which the penetration shaft of the connection terminal passes so as to have a larger diameter than the diameter of the penetration shaft beforehand; inserting the penetration shaft of the connection terminal into respective through-holes of the external lead, the external insulating member, the outer package body, the internal insulating member, and the internal lead; caulking another end of the penetration shaft to form a new flange; and applying caulking pressure to the external insulating member, the outer package body, and the internal insulating member through the tabular external lead and internal lead to cause the external insulating member and/or the internal insulating member to be pressed in between the through-hole of the outer package body formed largely beforehand and the penetration shaft.

The electric energy storage device manufacturing method set forth in claim 13 has steps according to claim 12, and wherein the outer package body is a multilayered outer package body further including an internal layer formed of a thermoplastic resin which can be heat-sealed, and after the external lead, the external insulating member, the outer package body, the internal insulating member, and the internal lead are connected together by the connection terminal, the internal insulating member is folded at an end portion of the internal lead to cover the end portion of the internal lead, an end portion of the battery element, and the flange of the connection terminal so that the internal insulating member follows surfaces of the end portion of the internal lead, the end portion of the battery element, and the flange of the connection terminal, and is retained in the outer package body.

Effect of the Invention

According to the electric energy storage device set forth in claim 1, because the connection terminal having the flanges integrally formed with the penetration shaft presses and holds the external lead, a good sealing property is ensured between the connection terminal and the external lead, the external insulating member and/or the internal insulating member pressed in between the penetration shaft and the metal layer of the outer package body surely suppresses any contact of the penetration shaft of the connection terminal with the metal layer, so that the electric energy storage device having a good insulation reliability can be realized with a simple structure. Moreover, it is possible to omit processes, such as filling of a separate insulating member between the metal layer of the outer package body and the penetration shaft beforehand and filling of the insulating member after connection, resulting in improvement of the workability and cost down.

According to the electric energy storage device set forth in claim 2, a space is formed between the penetration shaft of the connection terminal and the metal layer of the outer package body, so that press-in of the external insulating member and/or the internal insulating member is surely promoted by caulking pressure with a simple structure.

According to the electric energy storage device set forth in claim 3, because the internal insulating member also functions as the internal-layer protecting means for suppressing any damage due to a contact of the internal layer with metal parts, such as the battery element, the internal lead, and the connection terminal, it is possible to effectively suppress deterioration of the productivity and cost-up inherent to increasing of the number of parts and work processes, and a contact of the metal layer of the outer package body with the metal parts due to the damage of the internal layer can be suppressed before it happens.

According to the electric energy storage device set forth in claim 4, because the end portion of the internal lead which may damage the internal layer is covered across the lengthwise direction thereof, it is possible to suppress any direct contact of the internal layer with the end portion of the internal lead before it happens.

According to the electric energy storage device set forth in claim 5, because the internal flange of the connection terminal which may damage the internal layer is covered, it is possible to suppress any direct contact of the internal layer with the internal flange before it happens.

According to the electric energy storage device set forth in claim 6, because the internal insulating member has a cross-section formed in a rectangular shape without one side, as a part of the internal insulating member along the internal surface of the outer package body (corresponding to an upper part of the rectangle without one side) is sandwiched between the internal lead and the outer package body, it is unnecessary to fix a part which covers the end portion of the internal lead (corresponding to a side of the rectangle without one side) and a part covering the internal flange (corresponding to a lower part of the rectangle without one side) by means of adhesive or the like, so that alignment is easily accomplished.

According to the electric energy storage device set forth in claim 7, in comparison with a structure that, for example, one connection terminal is provided for each of the tabular external lead and internal lead, because the plurality of connection terminals are provided for each of the leads, the connection reliability with respect to the external lead is improved, and in comparison with a structure that separate insulating members are provided for individual plural penetration shafts, the connection workability with respect to the external lead is further improved.

According to the electric energy storage device set forth in claim 8, as the rivet is used as the connection terminal, it is possible to connect the internal lead and the external lead together by a relatively-simple and inexpensive technique.

According to the electric energy storage device set forth in claim 9, it is possible to reduce a contact resistance, and to suppress any thermal deformation inherent to differences in thermal expansion coefficients.

According to the electric energy storage device set forth in claim 10, as the internal insulating member is formed of a resin material having a higher melting point than the internal layer, it is possible to suppress any effect of heat at the time of heat-sealing to the internal insulating member.

According to the electric energy storage device set forth in claim 11, for example, several tens of the electric energy storage devices are connected in series, and can be applied to a hybrid vehicle (HEV) or an electric vehicle (EV) under a high voltage larger than or equal to 100 V (e.g., 500 V).

According to the electric energy storage device manufacturing method set forth in claim 12, by applying caulking pressure through the tabular external lead and internal lead, it is possible to suppress any local pressurization to the insulating member and the outer package body which causes a damage, and the external insulating member and/or internal insulating member provided at each surface of the outer package body is pressed in a space between the through-hole of the outer package body so formed as to have a larger diameter than the penetration shaft beforehand and the penetration shaft by uniform planer pressure, so that it is possible to easily provide the electric energy storage device surely having a connection reliability and a insulation reliability around the penetration shaft.

According to the electric energy storage device manufacturing method set forth in claim 13, it is possible to omit an incident process like a bonding work by utilizing the internal insulating member, and to easily realize the internal-layer protecting means for suppressing any direct contact of the metal parts with the internal layer of the outer package body before it happens.

DESCRIPTION OF REFERENCE NUMERALS

| | |
|---|---|
| 1 | Lithium ion secondary battery |
| 10 | Battery element |
| 10a | Positive electrode |
| 10b | Negative electrode |
| 11a | Positive electrode collector |
| 11b | Negative electrode collector |
| 12a | Positive electrode activation material |
| 12b | Negative electrode activation material |
| 15 | Separator |
| 20 | Outer package body |
| 21a | Internal layer |
| 21b | Metal layer |
| 21c | External layer |
| 23 | Heat-seal part |
| 25 | Insulating tape |
| 31 | Internal lead |
| 31a | Positive-electrode internal lead |
| 31b | Negative-electrode internal lead |
| 32 | External lead |
| 32a | Positive-electrode external lead |
| 32b | Negative-electrode external lead |
| 33 | Rivet |
| 33B | Internal flange |
| 33D | Stepped part |
| 33S | Penetration shaft |
| 33T | External flange |
| 41 | Internal insulating member |
| 43 | External insulating member |
| 51a, 51b, 51c, 51d, 51e, 51f, 51g | Through-hole |

BEST MODE FOR CARRYING OUT THE INVENTION

An explanation will be given of an embodiment of an electric energy storage device of the present invention.

Figure 1:
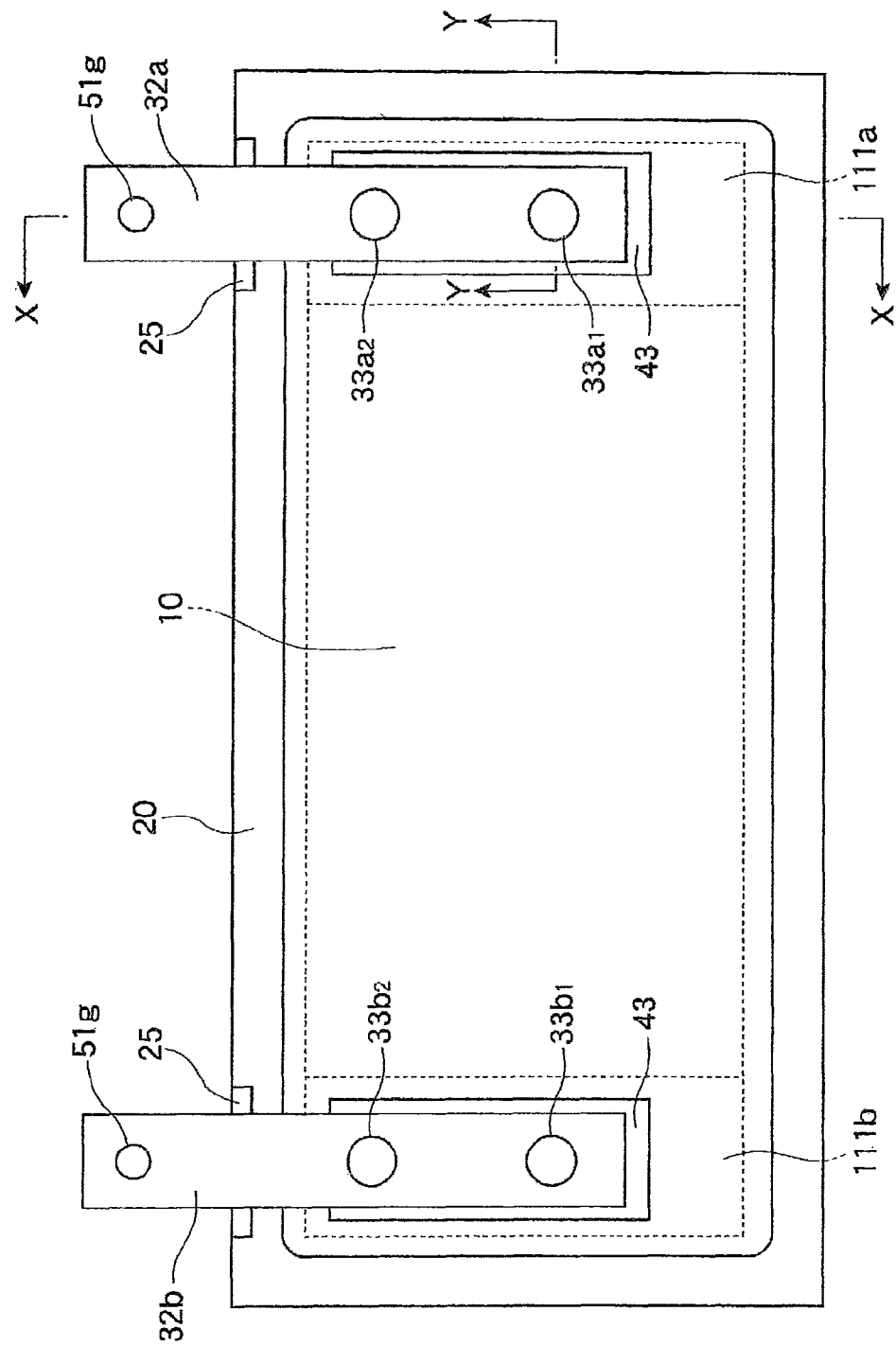
FIG. 1 is a plan view showing an electric energy storage device of the present invention.
Figure 2:
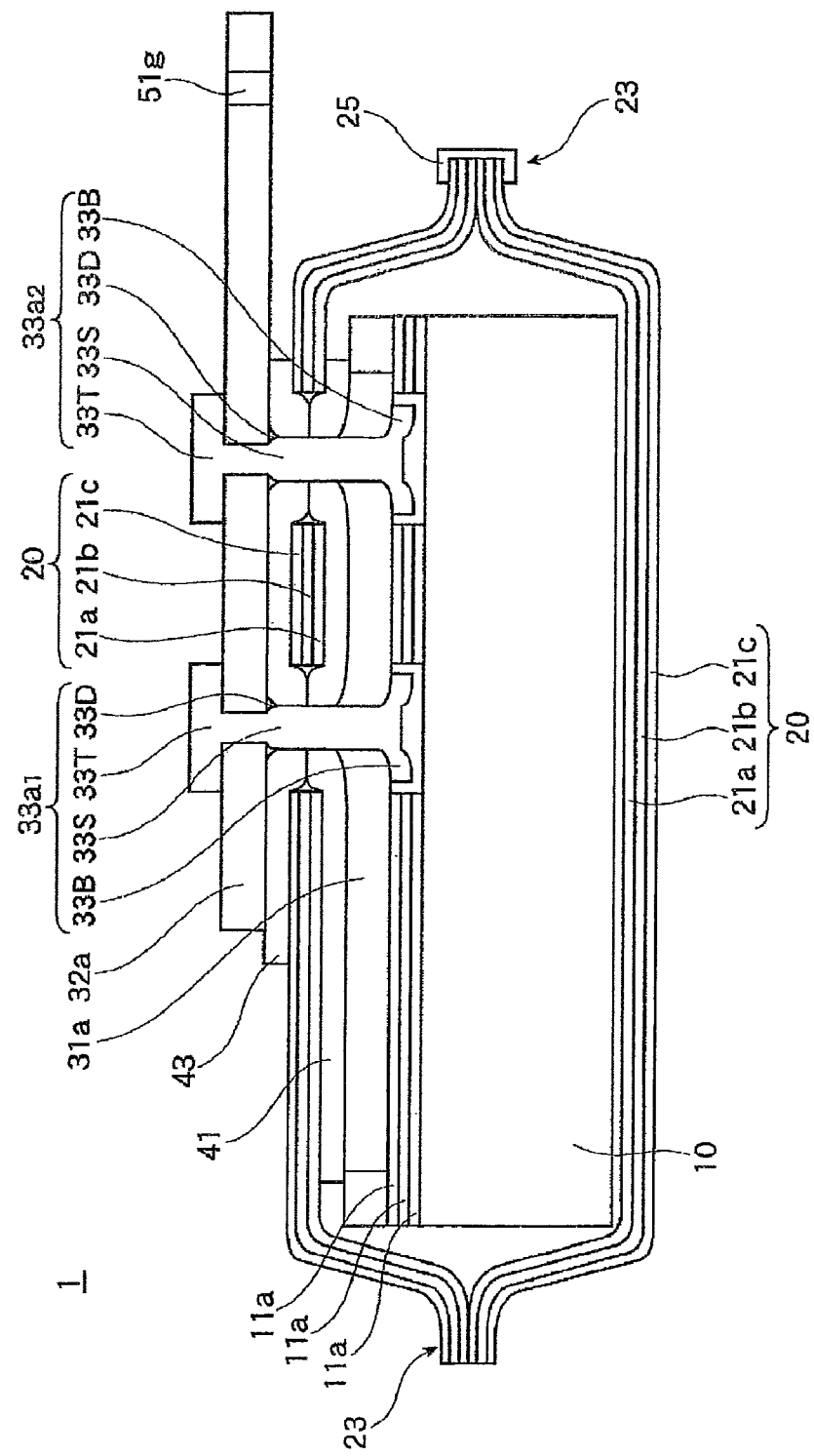
FIG. 2 is a cross-sectional view showing the electric energy storage device along a line X-X in FIG. 1.
Figure 3:
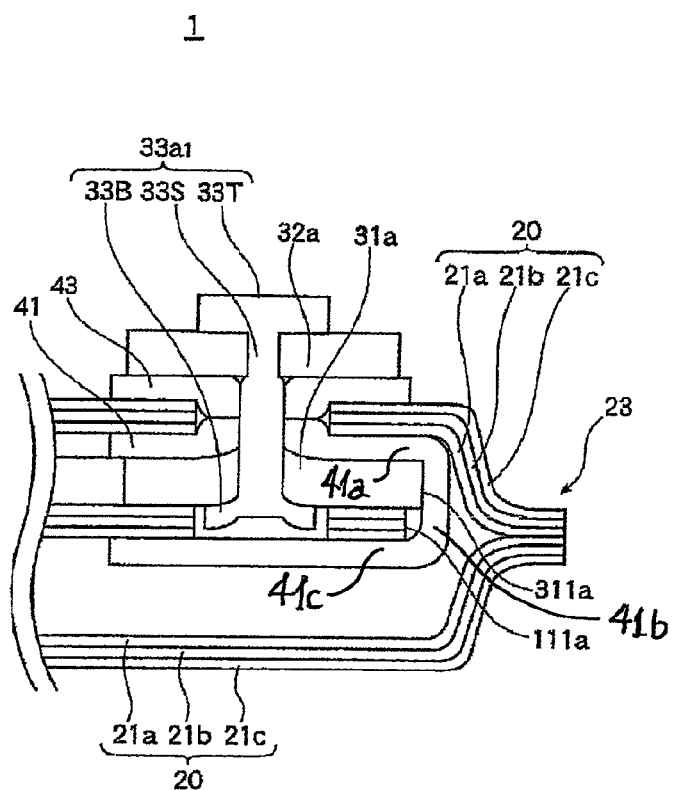
FIG. 3 is a cross-sectional view showing the electric energy storage device along a line Y-Y in FIG. 1.
Figure 4:
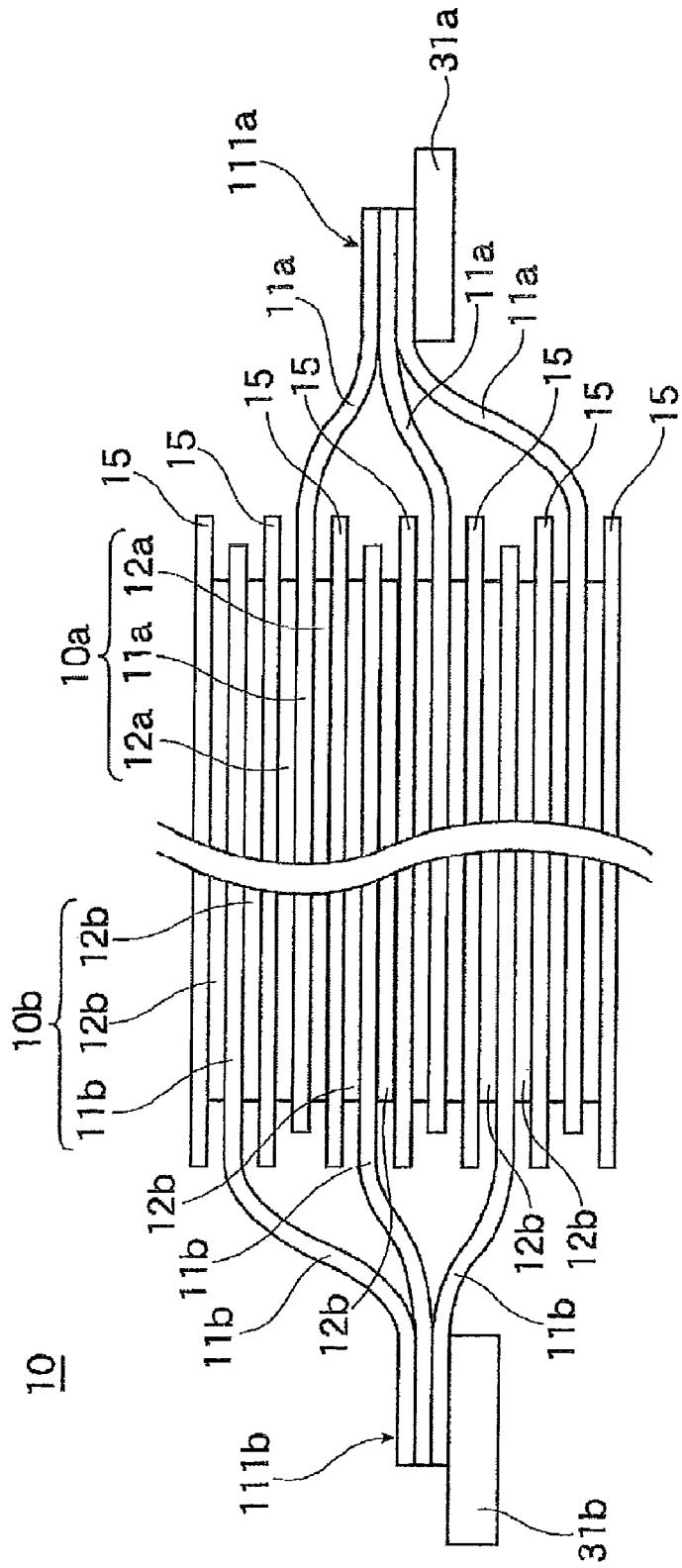
FIG. 4 is an explanatory diagram for a battery element 10.
Figure 5:
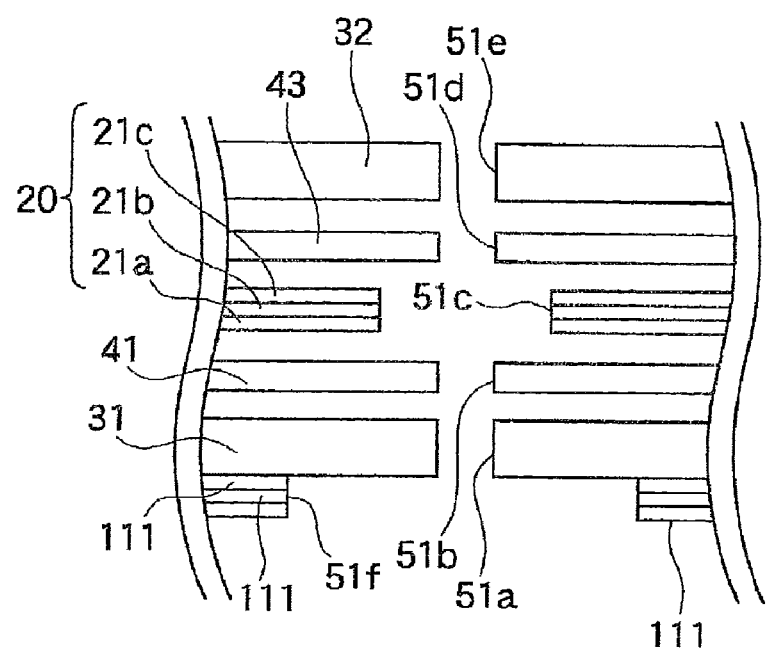
FIG. 5 is a partial explanatory diagram in the vicinity of a through-hole of the electric energy storage device.

FIG. 1 is a plan view showing the electric energy storage device of the present invention, FIG. 2 is a cross-sectional view along a line X-X in FIG. 1, FIG. 3 is a cross-sectional view along a line Y-Y in FIG. 1, FIG. 4 is an explanatory diagram for a battery element 10, and FIG. 5 is a partial explanatory diagram in the vicinity of a through-hole of the electric energy storage device (note that FIGS. 2, 3 and 5 are a cross-sectional view and a partial explanatory diagram at a positive electrode side, but the structures at a negative electrode side are same as those of the positive electrode side).

As shown in FIGS. 1 to 4, a lithium ion secondary battery 1 which is an example of the electric energy storage device of the present invention comprises a sheet-like battery element 10 including plural sheet-like positive electrodes 10a and plural sheet-like negative electrodes 10b alternately stacked together via separators 15, a flexible outer package body 20 for sealing and retaining the battery element 10 and a non-illustrated electrolysis solution thereinside, a positive-electrode internal lead 31a which connects individual positive electrodes 10a of the battery element 10 together inside the outer package body 20, a negative-electrode internal lead 31b which connects individual negative electrodes 10b of the battery element 10 together inside the outer package body 20, a positive terminal external lead 32a which is arranged at an external part of the outer package body 20 that corresponds to the positive-electrode internal lead 31a via the outer package body 20, a negative terminal external lead 32b which is arranged at an external part of the outer package body 20 that corresponds to the negative-electrode internal lead via the outer package body 20, and two pairs of (total: four) rivets $33a_1$, $33a_2$ (positive terminal side), and $33b_1$, $33b_2$ (negative electrode side) each serving as a connection terminal which airtightly passes all the way through the outer package body 20, which has one end connected to individual internal leads 31a, 31b inside the outer package body 20, and another end connected to individual external leads 32a, 32b outside the outer package body 20, and which establish an electrical connection between individual internal lead 31a, 31b and individual external lead 32a, 32b.

Provided between each internal lead 31a, 31b and the outer package body 20 and between each external lead 32a, 32b and the outer package body 20 are internal insulating member 41 and external insulating member 43 each sealing individual through-holes of the outer package body 20 where the rivets $33a_1$, $33a_2$, $33b_1$, $33b_2$ passes through, and ensuring the insulation property between a surface of the outer package body 20 and each internal lead 31a, 31b and each external lead 32a, 32b.

Next, an explanation will be given of each structural element of the lithium ion secondary battery of the present invention having the foregoing structure in detail.

<Battery Element 10>

As is most clearly shown in FIG. 4, the battery element 10 comprises the plurality of reed-shaped positive electrodes 10a and the plurality of reed-shaped negative electrodes 10b alternately stacked together via the plurality of reed-shaped separator 15. The positive electrode 10a has a positive electrode collector 11a with a positive electrode activation material 12a stacked on both surfaces thereof. The positive electrode collector 11a is formed of aluminum, and the positive electrode activation material 12a is a lithium-cobaltate composite oxide (LCO). Conversely, the negative electrode 10b has a negative electrode collector 11b with a negative electrode activation material 12b stacked on both surfaces thereof. The negative electrode collector 11b is formed of copper, and the negative electrode activation material 12b is a carbon material. An end portion 111a of the plural positive electrode collectors 11a forming the plural positive electrodes 10a and an end portion 111b of the plural negative electrode collectors 11b forming the plural negative electrodes 10b are stacked on corresponding positive-electrode internal lead 31a and negative-electrode internal lead 31b, respectively, and connected thereto by ultrasonic welding or the like.

<Other Embodiments of Battery Element 10>

In the foregoing embodiment, the battery element 10 employs a stacked sheet-feed structure having the reed-shaped positive electrodes, negative electrodes, and separators stacked together, but a rolled structure of rolling up lengthy positive electrode, negative electrode, and separator may be employed (for example, such a structure can be realized by pulling out respective end portions of the positive and negative electrode collectors up and down along the rolling axis, and by connecting the connection terminals of the embodiment to such end portions).

The battery element 10 is not limited to any particular one if it can be used for an electric energy storage device, such as a lithium ion secondary battery, a lithium secondary battery, a polymer secondary battery, or an electric double-layer capacitor.

The separator 15 is not limited to any particular one, and one conventionally well-known can be used. Regarding the separator of the present invention, the meaning must not be limited by such a name, and a solid electrolyte material or a gel electrolyte material which can function (serve) as a separator can be used instead of the separator. Moreover, a separator containing an inorganic material can be used.

As the positive electrode activation material 12a, in addition to lithium-cobalt composite oxide (LCO), a lithium-mangan composite material (LMO), or a lithium-nickel composite oxide (LNO) can be used. Moreover, a ternary element material like LNMCO or a binary element material, such as LMNO, LMCO, or LNCO can be used. Furthermore, a mixture of those materials can be used.

As the carbon material for the negative electrode activation material 12b, graphite or hard carbon can be used. Moreover, a mixture of those materials can be used.

<Outer Package Body 20>

As shown in FIGS. 2 and 3, the outer package body 20 of the present invention comprises laminated films with a three-layer structure each having an internal layer 21a (thickness: 30 to 120 μm) formed of polypropylene, a middle layer 21b (thickness: 30 to 50 μm) formed of an aluminum foil or an aluminum-alloy foil, and an external layer 21c (thickness: 20 to 40 μm) formed of nylon. Through-hole of the outer package body 20 where the rivet $33a_1$, $33a_2$ passes through has a diameter set to be larger than the diameter of the shaft of the rivet beforehand.

The outer package body 20 has two laminated films fainted in a cupped shape and overlapped with each other, and a heat-seal part 23 around the four sides of the overlapped laminated films is heat-sealed (thermal welding) to join the internal layers 21a together, thereby sealing the battery element 10 inside the outer package body 20. The laminated film is lightweight, has a superior flexibility, and has superior blocking function and sealing property against water or the like from the exterior.

As shown in FIGS. 1 and 2, an insulating film 25 (e.g., Kapton (registered trademark)) formed of a polyimide resin with a heat resisting property and an electric insulating property is provided around the edge of heat-seal part 23 of the outer package body 20 in the vicinity of the external lead 32a, 32b in the thickness direction of the outer package body 20 in order to suppress any short-circuiting as the external lead 32 contacts the middle layer (metal layer) 21b.

<Other Embodiments of Outer Package Body 20>

In the foregoing embodiment, the outer package body 20 comprises the laminated films with a three-layer structure, but the outer package body 20 may be structured in such a way that the major part (main plane) of the outer package body 20 is formed of a metal layer and an internal layer 21a has the heat-seal part 23 only which can be subjected to heat-sealing. As a material of the metal layer 21b, a metal having a barrier property against water, a flexibility and a superior strength can be used, and stainless, nickel, or a nickel alloy, copper or a copper alloy, iron or an iron alloy can be used. Regarding how to form the metal layer 21b, one which is in a foil-like shape (thin tabular shape) beforehand can be used, but one having undergone thin-film formation or plating can be used. The metal layer 21b may employ a multilayer structure. Moreover, the internal layer 21a and the external layer 21c may also employ a multilayer structure.

The internal layer 21a can be formed of a thermoplastic resin with good electrolysis-solution tolerability and heat seal property, such as polyethylene, polystyrene, polyamide, or ionomer. The external layer 21c can be formed of an insulating resin with a good electrical insulation property, such as polyester (PET or the like), or polyamide.

In the foregoing embodiment, two laminated films are overlapped together, and the heat-seal part 23 around the four sides thereof is thermally welded in order to seal the battery element 10 thereinside, but regarding how to seal the laminated films, a piece of laminated film may be doubled up and the heat-seal part 23 at the remaining three sides therearound may be thermally welded to join the remaining three sides, or a piece of laminated film may be formed in a tubular shape beforehand, and openings (heat-seal parts) at both sides may be thermally welded to join the respective openings. When a piece of laminated film is formed in a tubular shape, the position of the heat-seal part (strip part) other than the openings at both sides can be set arbitrary.

<Internal Lead 31a, 31b, External Lead 32a, 32b and Rivet $33a_1$ to $33b_2$>

As shown in FIGS. 1 to 3, the tabular internal lead 31a is electrically connected to the battery element 10 inside the outer package body 20, and the tabular external lead 32a electrically connected to the exterior is so arranged as to face the internal lead 31a with the outer package body 20 being interleaved. The internal lead 31a and the external lead 32a are mechanically and electrically connected together by the rivets $33a_1$, $33a_2$. The rivets $33a_1$, $33a_2$ each has a penetration shaft 33S which passes all the way through the internal lead 31a, the external lead 32a or the like, an external flange 33T integrally formed with the penetration shaft 33S at one end thereof and arranged outside the outer package body 20, and an internal flange 33B formed by caulking at another end of the penetration shaft 33S and arranged inside the outer package body 20.

The positive-electrode internal lead 31a is formed of a tabular member relatively thick, and such a thickness is set to be equal to the thickness of the end portion 111a of the plural positive electrode collectors 11a or larger (e.g., 0.3 to 3 mm). The internal lead 31a is formed of the same material as that of the positive electrode collector 11a like aluminum or an aluminum alloy. Conversely, the negative-electrode internal lead 31b is formed of a tabular member relatively thick, and such a thickness is set to be equal to the thickness of the end portion 111b of the plural negative electrode collectors 11b or larger (e.g., 0.3 to 3 mm). The internal lead 31b is formed of the same material as that of the negative electrode collector 11b like copper or a copper alloy. Each internal lead 31a, 31b is arranged and retained inside the outer package body 20 together with the battery element 10 in such a manner as to be located at each end of the lengthwise direction of the battery element 10 which is in a rectangular shape as viewed from a plane and to be parallel to the shorter direction of the battery element 10, and is connected to corresponding end portion 111a of the plural positive electrode collectors 11a of the battery element 10 or end portion 111b of the plural negative electrode collectors 11b by ultrasonic welding or the like.

Conversely, the positive-electrode external lead 32a is formed of a tabular member relatively thick, and such a thickness is set to be equal to the thickness of the internal lead 31a (e.g., 0.3 to 3 mm). The external lead 32a is formed of copper or a copper alloy. Note that copper or a copper alloy is preferable from the standpoint of reduction of a contact resistance when in use under a high voltage. Likewise, the negative-electrode external lead 32b is formed of a tabular member relatively thick, and such a thickness is set to equal to the thickness of the internal lead 31b (e.g., 0.3 to 3 mm). The external lead 32b is formed of the same material as that of the negative electrode collector 11b like copper or a copper alloy. The positive-electrode external lead 32a (right in FIG. 1) and the negative-electrode external lead 32b (left in FIG. 1) are arranged outside the outer package body 20 so as to face corresponding positive-electrode internal lead 31a and negative-electrode internal lead 31b, respectively, with the outer package body 20 being interleaved. That is, each external lead 32a, 32b is not pulled out externally from the heat seal part 23 around the four sides of the outer package body 20, but are pulled out externally in such a manner as to extend along the external surface of the outer package body 20 and to face corresponding internal lead 31a, 31b.

An L size (size in the lengthwise direction) of the internal lead 31a and that of the external lead 32a are same, and are same as a W size (size in the width direction) of the battery element 10. Moreover, as shown in FIG. 3, a W size of the internal lead 31a and that of the external lead 32a are substantially same. The internal lead 31a and the external lead 32a also have the same T size (size in the height direction).

Regarding the rivet $33a_1$, $33a_2$, the penetration shaft 33S and the external flange 33T are integrally formed with each other beforehand. The external flange 33T has a flat external surface, and the thickness of a flanged part is uniform. Conversely, the internal flange 33B is formed as a part of the penetration shaft 33S is crushed by caulking a leading end of the penetration shaft 33S, and in comparison with the external flange 33T, the thickness is not uniform, and the surface roughness of the external surface is rougher. The penetration shaft 33S has a stepped part 33D having a diameter becoming larger by caulking and having a different diameter from that other part. As the external lead 32a is mounted on the stepped part 33D, it is surely engaged with the external lead 32a, resulting in reduction of a contact resistance. Note that the internal lead 31a and the stepped part 33D may be joined together depending on how to crush the rivet.

Regarding the rivet $33a_1$, $33a_2$, in addition to integration of the penetration shaft 33S with the external flange 33T beforehand, the internal flange 33B is also integrally formed at the time of caulking, and for example, in comparison with a fastening structure by means of a bolt and a nut or a bonding structure by means of a resin or the like, the flanges integrally formed with the penetration shaft can further effectively prevent any water from entering from the exterior. By employing such rivet $33a_1$, $33a_2$, extremely superior sealing property and conductive property can be realized.

The positive-electrode rivet $33a_1$, $33a_2$ is formed of the same material as that of the positive-electrode internal lead 31a like aluminum or an aluminum alloy, and the negative-electrode rivet $33b_1$, $33b_2$ is formed of the same material as those of the negative-electrode internal lead 31b and the external lead 32b like copper or a copper alloy. As the internal lead 31a, 31b and the rivet $33a_1$, $33a_2$ are formed of the same material, it is possible to reduce a contact resistance and to suppress any thermal deformation originating from differences in thermal expansion coefficients.

The plurality of positive-electrode rivets $33a_1$, $33a_2$ and the plurality of negative-electrode rivets $33b_1$, $33b_2$ are provided for corresponding positive-electrode external lead 32a (internal lead 31a) and negative-electrode external lead 32b (internal lead 31b) (in the embodiment, each two rivets $33a_1$, $33a_2$ and $33b_1$, $33b_2$ for each positive terminal and negative terminal), respectively. More specifically, as shown in FIGS. 1 and 2, a substantial center portion in the lengthwise direction of the positive-electrode internal lead 31a and an end portion in the lengthwise direction of the positive-electrode external lead 32a (left end part of the external lead 32a in FIG. 2) are connected together by the positive-electrode rivet $33a_1$, and an end portion in the lengthwise direction of the positive-electrode internal lead 31a (right end part of the internal lead 31a in FIG. 2) and a substantial center portion in the lengthwise direction of the positive-electrode external lead 32a are connected together by the positive-electrode rivet $33a_2$. Likewise, a substantial center portion in the lengthwise direction of the negative-electrode internal lead 31b and an end portion in the lengthwise direction of the negative-electrode external lead 32b are connected together by the negative-electrode rivet $33b_1$, and an end portion in the lengthwise direction of the negative-electrode internal lead 31b and a substantial center portion in the lengthwise direction of the negative-electrode external lead 32b are connected together by the negative-electrode rivet $33b_2$. Accordingly, the connection reliability between each internal lead 31a (31b) and each external lead 32a (32b) is improved. Moreover, in response to a requisite for increasing of the capacity and high-voltage usage, when the external lead formed in a tabular shape as explained above is used, it is desirable to connect the external lead by a plurality of rivets, but in comparison with a structure in which a plurality of individual insulating materials are provided around a plurality of individual through-holes, because the internal insulating member and the external insulating member to be discussed later are each a single part, it is possible to reduce the number of parts, to omit a bonding work, and to simplify an alignment work, resulting in remarkable improvement of the productivity and cost down.

<Other Embodiments of Internal Lead 31a, 31b, External Lead 32a, 32b and Rivet $33a_1$ to $33b_2$>

In the foregoing embodiment, the positive-electrode internal lead 31a and external lead 32a are formed of different materials, but may be formed of the same material. When the external lead 32a is formed of aluminum or an aluminum alloy like the internal lead 31a, it is effective from the standpoint of weight saving. Moreover, the negative-electrode internal lead 31b and external lead 32b are formed of the same material, but may be formed of different materials. Nickel plating or tin plating may be performed on the copper or copper alloy of the negative-electrode external lead 32b.

The magnitude relations between the L size, W size, and T size of the internal lead 31a, 31b and those of the external lead 32a, 32b are not limited to the foregoing examples, and can be set arbitrary. The magnitude relations between the L size of the internal lead 31a, 31b and the W size of the battery element 10 can be also set arbitrary.

For example, when the internal lead 31a, 31b and the external lead 32a, 32b are formed of different materials, there are some cases in which it is desirable to set the L size, W size, and T size differently for the internal lead 31 and the external lead 32, and those sizes can be set appropriately in accordance with an allowable current or the like of the internal lead 31 and that of the external lead 32.

The shape of the external lead 32a, 32b is not limited to any particular one. Such a shape is not limited to the foregoing linear shape, and a protruding end part (through-hole 51g side in FIG. 1) may be inflected in a hook-like shape, may be curved in an R shape, or may be bifurcated. The L size, W size, and T size of the external lead 32a, 32b may not be entirely uniform, and for example, there may be a thin part or a thick part.

The direction in which the external lead 32a, 32b is pulled out in parallel is not limited to the shorter direction of the outer package body 20 like the foregoing embodiment, and the external lead may be pulled out in the same straight line in the lengthwise direction (horizontal direction in FIG. 1) of the outer package body 20. The positive-electrode external lead 32a and the negative-electrode external lead 32b may not be pulled out in the same direction, and can be pulled out in opposite directions (vertical direction in FIG. 1) or in asymmetrical directions.

Examples of the rivet of the foregoing embodiment are a solid rivet, a full tubular rivet, a semi tubular rivet, a split rivet, a compression rivet, and a blind rivet.

The internal lead 31a, 31b or the external lead 32a, 32b and the rivet $33a_1$ to $33b_2$ may be integrally formed with each other beforehand. For example, the penetration shaft 33S may be integrally formed with either one of the internal lead 31a and the external lead 32a beforehand, and a through-hole where the penetration shaft 33S is to be inserted may be formed in another lead, and a protruding part after insertion may be caulked to form a flange (the same is true of the internal lead 31b and the external lead 32b).

As a connection terminal, means like a screw or a bolt and a nut may be used, but such means has a poor sealing property from the exterior, so that at least the external flange 33T must be integrally formed with the penetration shaft 33S beforehand when such means is used.

Regarding the rivets $33a_1$ to $33b_2$, each two rivets are provided for each positive electrode and negative electrode, but the number of such rivets is not limited to any particular number. However, it is desirable that such a number is at least two in order to suppress any rotation of the external lead 32a, 32b to be connected.

Moreover, it is possible to set the penetration shaft 33S to have an arbitrary cross-sectional shape. If the cross-sectional shape is, for example, an elliptical shape or a polygonal shape, it is effective for suppressing any rotation. It is also possible to set the external flange 33T to have an arbitrary planar shape. When the cross-sectional shape of the penetration shaft 33S is a shape which can suppress any rotation, merely one rivet $33a_1$ to $33b_2$ may be provided at a substantial center portion (position of the rivet $33a_1$, $33b_1$ in FIG. 1) of the internal lead 31a, 31b. In this case, it is possible to suppress any electro-current constriction at the rivet (connection terminal $33a_2$, $33b_2$ in FIG. 1) near the connection to the exterior.

<Insulating Member>

As shown in FIGS. 1 to 3, the internal insulating member 41 which is formed of the same material (in the embodiment, polypropylene) as that of the internal layer 21a of the outer package body 20 and which has a thickness of 100 to 350 μm is interleaved between the internal surface of the outer package body 20 and the internal lead 31a, and the external insulating member 43 which is formed of the same material (in the embodiment, polypropylene) as that of the internal insulating member 41 and which has a thickness of 100 to 350 μm is interleaved between the external surface of the outer package body 20 and the external lead 32a. Note that the external insulating member 43 may be formed of the same material as that of the external layer 21c of the outer package body 20.

As will be discussed in detail later, when individual members are connected together by the rivet $33a_1$ to $33b_2$, the internal insulating member 41 and the external insulating member 43 are interleaved (pushed-in) so as to contact with each other between the metal layer 21b of the outer package body 20 and the penetration shaft 33S of the rivet $33a_1$ to $33b_2$. Accordingly, it is possible to realize improvement of the sealing property and the insulation property around the rivet with a simple structure.

Furthermore, as shown in FIG. 3, the internal insulating member 41 of the embodiment is formed in such a manner as to have a cross-section in a rectangular shape without one side, so that the internal insulating member 41 can also function as internal-layer protecting means for protecting the internal layer 21a of the outer package body 20 from any mechanical damage. More specifically, from the left to the right (outward) in FIG. 3, the internal insulating member 41 covers a surface of the internal lead 31a at a part (corresponding to an upper part of the rectangle without one side) along the internal layer 21a of the outer package body 20 (along the surface of the internal lead 31a), covers a surface of the end portion 311a of the internal lead 31a and a surface of the end portion 111a of the collectors 11 both located near the internal layer 21a at a part where the internal insulating member 41 goes down from the foregoing part which covers the internal lead 31a and folded back by about 90 degree (corresponding to a right side of the rectangle without one side), and covers a surface of the internal flange 33B at a part where the internal insulating member 41 is folded down by about 90 degree from the right to the left (inward) (corresponding to a lower part of the rectangle without one side) (the same is true for the negative electrode side).

Note that in FIG. 3, there is a tiny space between the end portion 111a of the collectors 11 and the internal insulating member 41, but the internal insulating member 41 may be formed in such a manner as to follow (completely fit) the end portion 311a of the internal lead 31a and the surface of the end portion 111a of the collectors 11. The internal insulating member 41 covers the end portion 311a of the internal lead 31a and the end portion 111a of the collectors 11a from a side outwardly of the paper of FIG. 3 to a side inwardly of such paper, i.e., across the entire lengthwise direction of the end portion 311a of the internal lead 31a.

In general, according to the outer package body 20 with a multilayer structure having the internal layer 21a formed of a thermoplastic resin (in the embodiment, polypropylene) to ensure heat sealing and the metal layer 21b provided outwardly of the internal layer, when the internal layer 21a and the metal part (e.g., the internal lead 31a, the positive electrode collectors 11a and the internal flange 33B) inside the outer package body 20 contact with each other, the internal layer 21a may be damaged, and the metal layer 21b may be exposed. Such exposure of the metal layer 21b due to damage of the internal layer 21b may result in a short-circuiting in future due to a contact with the metal part.

Accordingly, as explained above, the internal insulating member 41 is folded back in the vicinity of the end portion of the internal lead 31a located near the internal layer 21a of the outer package body 20, and is formed so as to have a cross-section in the shape like the rectangle without one side which covers the end portion 311a of the internal lead 31a, the end portion 111a of the collectors 11a, and the internal flange 33B, so that the internal insulating member 41 of the embodiment also functions as the internal-layer protecting means for suppressing any damage of the internal layer 21a. Accordingly, it is possible to suppress any damage of the internal layer 21a due to a contact with the metal member with a simple structure, and to suppress any short-circuiting before it happens due to a contact with the metal layer 21b. Moreover, because the internal layer 21a of the outer package body 20 is protected by just diverting (using for another purpose) the internal insulating member 41 and by folding back the internal insulating member 41, in comparison with a structure which requires a separate protecting member, it is possible to reduce the number of parts, and to omit an incidental work process like a bonding work, resulting in cost down and improvement of the productivity.

As shown in FIGS. 2 and 3, the internal insulating member 41 has an L size which is larger than or equal to the L size of the internal lead 31a, and has a W size which is larger than or equal to the W size of the internal lead 31a.

In contrast, the external insulating member 43 has an L size in such a way that the external lead 32a does not abut the main plane of the external layer 21c of the outer package body 20 as much as possible, and has a W size which is equal to that of the internal insulating member 41.

<Other Embodiments of Insulating Member>

It is fine if the internal insulating member 41 is formed of a thermoplastic resin with good electrolysis-solution tolerability and heat sealing property, and may be formed of resins, such as polyethylene, polystyrene, polyamide, and ionomer. Moreover, from the standpoint of avoiding any effect by heat at the time of heat sealing, it is desirable that the internal insulating member 41 should be formed of a resin material having a higher melting point than the internal layer 21a of the outer package body 20. Furthermore, the internal insulating member 41 and the external insulating member 43 may be formed of different materials, and may have different widths and thicknesses.

In the foregoing embodiment, the internal insulating member 41 is formed in such a manner as to have a cross-section in a rectangular shape without one side (i.e. a U-shape form), but may have an L-shaped cross section so as to cover the surface of the internal lead 31a at a part 41a (corresponding to an upper part of the L-shape) along the internal layer 21a (a surface of the internal lead 31a) of the outer package body 20, and cover surface of the end portion 311a of the internal lead 31a and the surface of the end portion 111a of the positive electrode collectors 11a located in the vicinity of the internal layer 21a of the outer package body 20 at a part 41b where the internal insulating member 41 goes down from the foregoing part 41a and is folded by about 90 degree (corresponding to a side of the L-shape) (the internal flange 33B is not covered). Even if such a cross-section in the shape like the rectangle without one side (i.e. a U-shape form) is employed, the internal insulating member 41 can cover the surface of the internal lead 31a at a part 41a (corresponding to an upper part of the rectangle without one side) along the internal layer 21a (the surface of the internal lead 31a) of the outer package body 20, be folded by about 90 degree downwardly (corresponding to a side part 41b of the rectangle without one side), and cover the surface of the internal flange 33B at a part 41c (corresponding to a lower part of the rectangle without one side) where the internal insulating member 41 is folded again by about 90 degree (the end portion 311a of the internal lead 31a and the surface of the end portion 111a of the positive electrode collectors 11a are not covered in this case). Moreover, it is not necessary to cause the internal insulating member 41 to completely cover the surface of the internal lead 31a, the end portion 311a thereof, and the internal flange 33B, and it is just fine if the internal insulating member 41 functions as the internal-layer protecting means for protecting the internal layer 21a of the outer package body 20 from any mechanical damage.

In the foregoing embodiment, the internal insulating member 41 also serves as the internal-layer protecting means for protecting the internal layer 21a of the outer package body 20 from any mechanical damage, but needless to say, such internal-layer protecting means can be separately and independently prepared as an end portion cover or a flange cover. Moreover, the internal-layer protecting means for suppressing any damage of the internal layer 21a originating from a contact may be realized by performing rounding, curving, a surface processing, or the like on the end portion 311a of the internal lead 31a, the end portion 111a of the positive electrode collectors 11a, and the surface of the internal flange 33B.

It is fine if the external insulating member 43 is formed of an insulating resin with a good electrical insulation property, and may be formed of resins, such as polyester, and polyamide. The internal insulating member 41 and the external insulating member 43 may be formed of different materials. The internal insulating member 41 and the external insulating member 43 may be formed of the same materials as those of the internal layer 21a of the laminated film and the external layer 21c thereof, respectively, but may be formed of different materials.

The internal insulating member 41 and the external insulating member 43 can be formed of the foregoing insulating resin, but may be formed of an elastic material like a natural rubber or a synthetic rubber. This ensures stress relief around the rivet.

Moreover, a bush member may be inserted in the external flange 33T beforehand so that an insulating resin is arranged around the penetration shaft 33S at the time of caulking. Furthermore, the surface of the penetration shaft 33S may be pre-coated with an insulating resin like a silicon resin.

<Manufacturing Method>

How to manufacture the lithium ion secondary battery 1 which is the electric energy storage device of the present invention is not limited to any particular one, but such a lithium ion secondary battery can be manufactured through following processes. The connection method is common for the positive electrode and the negative electrode, so that general reference numerals will be given to individual units (e.g., the collector 11).

(1) First, as shown in FIG. 5, through-holes (51a to 51e) corresponding to one another are formed in respective positions of the internal lead 31 connected to the battery element 10, the internal insulating member 41, the outer package body 20, and the external lead 32. A through-hole 51g which enables a connection to an external connection terminal or a connection for an assembled battery is formed in the leading end of the external lead 32.

(2) Next, the battery element 10 is connected to the internal lead 31. More specifically, respective end portions 111 of the plural collectors 11 are overlapped one another, and from the standpoint of protecting the collectors 11 from any mechanical damage at the time of caulking the penetration shaft 33S, a through-hole 51f having a diameter with a margin so that the end portion 111 of the collector 11 does not contact the internal flange 33b to be discussed later is formed in the end portion 111 of the collector 11. The through-hole 51a of the internal lead 31 and the through-hole 51f of the end portion 111 of the collector 11 are roughly aligned, and using a non-illustrated jig, the end portion 111 of the collector 11 and the internal lead 31 are connected together by ultrasonic welding.

The through-hole 51a of the internal lead 31, the through-hole 51b of the internal insulating member 41, the through-hole 51d of the external insulating member 43 and the through-hole 51e of the external lead 32 are so formed as to have an equal diameter to the diameter of the penetration shaft 33S of the rivet 33, but the through-hole 51c of the outer package body 20 is so formed as to have a larger diameter than the diameter of the penetration shaft 33S of the rivet 33 beforehand. As the through-hole 51c of the outer package body 20 is so formed as to have a larger diameter than the diameter of the penetration shaft 33S of the rivet 33 in this fashion, when the penetration shaft 33S is inserted, there is created a space between the penetration shaft 33S and the outer package body 20 (in particular, the metal layer 21b). It is desirable that the diameter of the through-hole 51c of the outer package body 20 should be smaller than the diameter of the external flange 33T of the rivet 33 from the standpoint of surely sandwiching the outer package body 20. Regarding the internal insulating member 41, it is formed beforehand in such a manner as to have a predetermined length so that the internal insulating member 41 can cover the end portion 311 of the internal lead 31, the end portion 111 of the collectors 11, and the surface of the internal flange 33B.

Note that after the through-holes 51f, 51a are formed in the end portion 111 of the collectors 11 and the internal lead 31, respectively, such an end portion 111 and internal lead 31 can be connected together by ultrasonic welding, but from the standpoint of simplifying the manufacturing processes, the through-hole 51a (51f) passing all the way through the internal lead 31 and the end portion 111 of the collectors 11 can be simultaneously formed after the battery element 10 and the internal lead 31 are connected together by ultrasonic welding.

(3) Next, the battery element 10 provided with the internal lead 31 is retained in the outer package body 20 formed of two pieces of films up and down in a cupped shape.

(4) Next, the internal insulating member 41, the outer package body 20, the external insulating member 43, and the external lead 32 are disposed on the internal lead 31 while aligning the respective through-holes 51a, 51b, 51c, 51d, and 51e one another.

(5) Thereafter, the rivet 33 having the external flange 33T and the penetration shaft 33S is prepared, and the penetration shaft 33S is inserted into the external insulating member 43, the outer package body 20, the internal insulating member 41, and the internal lead 31 in this order through the through-holes 51e, 51d, 51c, 51b, and 51a with the external flange 33S being directed to the exterior.

(6) Next, the protruding leading end of the penetration shaft 33S is depressed (caulked) by hammering, hydraulic pressure, air pressure, or the like using a non-illustrated jig to crush the leading end of the penetration shaft 33S, thus newly forming the internal flange 33B.

As caulking is carried out by the rivet 33 via the internal lead 31 and the external lead 32 in this fashion, the internal insulating member 41, the outer package body 20, and the external insulating member 43 are sandwiched between the tabular internal lead 31 and external lead 32 under planar pressure, so that the through-hole 51a of the outer package body 20 through which the rivet 33 passes all the way is airtightly sealed, while at the same time, the rivet 33 electrically connects between the internal lead 31 and the external lead 32. Moreover, because the diameters of the through-holes 51b, 51d of the internal insulating member 41 and the external insulating member 43 are set to be substantially equal to the diameter of the penetration shaft 33S, and the diameter of the through-hole 51a of the outer package body 20 is set to be larger than the diameter of the penetration shaft 33S, the internal insulating member 41 and/or the external insulating member 43 is pressed in the space between the penetration shaft 33S of the rivet 33 and the outer package body 20 by caulking pressure at the time of rivet connection, so that it is possible to stably ensure the insulating property with the metal layer 21b of the outer package body 20 for long periods.

More specifically, the internal insulating member 41 and the external insulating member 43 are arranged inwardly and outwardly of the outer package body 20, respectively, before caulking, but because the internal lead 31 is deformed in a direction coming close to the external lead 32 (both internal lead 31 and external lead 32 may be deformed in some cases) at the time of caulking, the internal insulating member 41 and the external insulating member 43 are also deformed in a direction coming close to each other and closely contact with each other. That is, deformation of the internal lead 31 and/or external lead 32 at the time of caulking promotes press-in and filling of the internal insulating member 41 and/or external insulating member 43 into the through-hole 51c. Accordingly, it is possible to surely cause the insulating members 41, 43 to intervene between the metal layer 21b of the outer package body 20 and the penetration shaft 33S with a simple structure without precisely aligning the outer package body 20 and the rivet 33.

Moreover, because the internal insulating member 41 and the external insulating member 43 are pressed-in by planer pressurization through the tabular internal lead 31 and external lead 32, it is possible to suppress any mechanical damage like breakage of the internal insulating member 41, the external insulating member 43, and the outer package body 20 beforehand due to local pressurization, and to suppress any excessive widening of the individual through-holes, resulting in achievement of a good sealing property.

Furthermore, the insulating member intervene around the penetration shaft 33S is configured by the internal insulating member 41 and/or the external insulating member 43, it is possible to omit steps, such as filing of a separate insulating member between the metal layer 21b of the outer package body 20 and the penetration shaft 33S beforehand, and filling of a separate insulating member after connection, resulting in improvement of the workability and cost down.

(7) Thereafter, in the outer package body 20 formed of two pieces of films up and down in a cupped shape, the internal insulating member 41 is folded at an end portion (near the seal part 23 of the outer package body 20) of the internal lead 31 to cover the end portion 311 of the internal lead 31, the end portion 111 of the collectors 11, and the internal flange 33B by the internal insulating member 41. Accordingly, the internal-layer protecting means for preventing the internal layer 21a from any mechanical damage due to a contact of the internal layer 21a of the outer package body 20 with the metal member can be simply realized by diverting (utilizing) the internal insulating member 41.

(8) Next, the heat-seal part 23 around the four sides of the outer package body 20 is thermally-welded to heat-seal the internal layers 21a together, and the outer package body is entirely sealed by vacuuming.

(9) Next, a part of the heat-seal part 23 of the outer package body 20 is cut to form an opening, and an electrolysis solution is filled in the outer package body 20 through the opening, and the opening is temporarily sealed.

(10) Next, initial charging is carried out, degassing is carried out, the internal part of the cut heat-seal part 23 is thermally-welded again to close the opening, and the outer package body is entirely sealed.

<Other Embodiments of Manufacturing Method>

It is preferable that the diameter of the through-hole 51c of the outer package body 20 should be set to be smaller than or equal to the diameter of the external flange 33T of the rivet 33. If the diameter of the through-hole 51c is excessively larger than the diameter of the external flange 33T, the sealing reliability may be deteriorated. Moreover, the internal insulating member 41 and/or the external insulating member 43 is likely to closely contact the penetration shaft 33S if the diameter of the through-hole 51b of the internal insulating member 41 and that of the through-hole 51d of the external insulating member 43 are slightly smaller than the diameter of the penetration shaft 33S of the rivet 33, but if those diameters are too small, undesirable deformation such that the internal insulating member 41 and/or the external insulating member 43 is bent or lifted up may occur. The through-hole 51b of the internal insulating member 41 and the through-hole 51d of the external insulating member 43 may have different diameters. The internal insulating member 41 located near the internal flange 33B newly formed by caulking is likely to deform, the through-hole 51b may be so formed as to have a slightly smaller diameter than the diameter of the through-hole 51d in consideration of the amount of such deformation.

Using the electric energy storage device formed as explained above, a result of comparing the insulation property thereof with that of an electric energy storage device with a conventional structure will be explained below as an example. In order to carry out the comparison, one (first comparative example) having the leading end of an internal lead caused to protrude to the exterior from a heat-seal part 23 and having such a part protruding externally as an external lead, and one (second comparative example) having a connection structure using a rivet 33 and having an outer package body 20 with a through-hole 51c so formed as to have a diameter substantially equal to a diameter of a penetration shaft 33S of the rivet 33 were used to measure the respective insulation properties for comparison.

FIRST EXAMPLE

The specifications of the individual elements for comparison were as follows.

Battery element 10: 300 mm (L size)×120 mm (W size)×5 mm (T size)

Internal lead 31: 100 mm (L size)×15 mm (W size)×1.5 mm (T size), made of aluminum, diameter of through-hole 51a: 4 mm External lead 32: 100 mm (L size)×15 mm (W size)×1.5 mm (T size), made of aluminum or copper, diameter of through-hole 51e: 4 mm Rivet 33: diameter of penetration shaft 33S was 4 mm φ×length 6 mm, was a rivet formed of aluminum or copper, diameter of external flange 33T: 8 mm Internal insulating member 41, external insulating member 43: made of polypropylene having a thickness of 250 μm, diameter of each through-hole 51b, 51d: 4 mm Outer package body 20: 320 mm (L size)×135 mm (W size)×7 mm (T size), made of aluminum laminated film (internal layer 21a: polypropylene having a thickness of 80 μm, metal layer 21b: aluminum foil having a thickness of 40 μm, external layer: nylon having a thickness of 25 μm), diameter of through-hole 51c: 6 mm Electrolysis solution: ethylene carbonate (EC) and diethyl carbonate (DEC), 1 mol/l of LiPF6 was dissolved as salt Under the foregoing conditions, ten lithium ion secondary batteries with a battery capacity of 10 Ah and a voltage of 4.2 V were manufactured to use those in the first example. The lithium ion secondary batteries were separated five by five, and using a commercially-available insulating-resistance tester (measurable up to 2000 MΩ, at 100 V, and up to 4000 MΩ at 500 V), an insulating resistance when 100-V voltage was applied for five seconds and an insulating resistance when 500-V voltage was applied for five seconds were respectively measured.

Likewise, each five lithium ion secondary batteries with a battery capacity of 10 Ah and a voltage of 4.2 V were manufactured to use those in the first and second comparative examples, respectively, and an insulating resistance when 100-V voltage was applied for five seconds was measured. The measurement results are shown in table 1. Note that regarding first and second comparative examples, because an insulating resistance when 100-V voltage was applied for five seconds became small, no insulating resistance when 500-V voltage was applied for five seconds was measured.

two-wheel vehicle with hard vibration. That is, according to a structure of the conventional technology disclosed in patent literature 1 such that a connection terminal protrudes from a thermally-welded heat-seal part of an outer package body (in other words, a structure that a connection terminal is sandwiched as portions of the outer package body are chemically joined together), due to hard vibration from the exterior, a battery element and the connection terminal also vibrate so hard, that the sealing property at the heat-seal part may be deteriorated.

Conversely, according to the electric energy storage device of the present invention, the tabular lead terminal and the connection terminal having a shaft and flanges are mechanically and electrically connected together, and the connection terminal sandwiches the outer package body with the tabular lead terminal, so that the outer package body can be firmly held between the lead terminal and the connection terminal against heavy vibration from the exterior, a high sealing property is maintained, and a high insulation property is also maintained with a simple structure. Therefore, the electric energy storage device of the present invention is appropriate

TABLE 1

| MEASUREMENT CONDITION | NUMBER | FIRST EXAMPLE POSITIVE ELECTRODE SIDE | FIRST EXAMPLE NEGATIVE ELECTRODE SIDE | FIRST COMPARATIVE EXAMPLE POSITIVE ELECTRODE SIDE | FIRST COMPARATIVE EXAMPLE NEGATIVE ELECTRODE SIDE | SECOND COMPARATIVE EXAMPLE POSITIVE ELECTRODE SIDE | SECOND COMPARATIVE EXAMPLE NEGATIVE ELECTRODE SIDE |
|---|---|---|---|---|---|---|---|
| INSULATING RESISTANCE UNDER 100 V FOR 10 s (MΩ) | 1 | LARGER THAN OR EQUAL TO 2000 | LARGER THAN OR EQUAL TO 2000 | 136.8 | 18.5 | 296.0 | 136.9 |
| | 2 | LARGER THAN OR EQUAL TO 2000 | LARGER THAN OR EQUAL TO 2000 | 455.0 | 152.0 | 432.0 | 221.0 |
| | 3 | LARGER THAN OR EQUAL TO 2000 | LARGER THAN OR EQUAL TO 2000 | 54.0 | 3.9 | 232.0 | 316.0 |
| | 4 | LARGER THAN OR EQUAL TO 2000 | LARGER THAN OR EQUAL TO 2000 | 16.5 | 1.9 | 440.0 | 483.0 |
| | 5 | LARGER THAN OR EQUAL TO 2000 | LARGER THAN OR EQUAL TO 2000 | 25.8 | 42.6 | 286.0 | 215.0 |
| | AVERAGE | — | — | 137.6 | 43.8 | 337.2 | 274.4 |
| INSULATING RESISTANCE UNDER 500 V FOR 10 s (MΩ) | 1 | 3140 | 3870 | — | — | — | — |
| | 2 | 2080 | LARGER THAN OR EQUAL TO 4000 | — | — | — | — |
| | 3 | LARGER THAN OR EQUAL TO 4000 | 3670 | — | — | — | — |
| | 4 | 2870 | LARGER THAN OR EQUAL TO 4000 | — | — | — | — |
| | 5 | 3910 | LARGER THAN OR EQUAL TO 4000 | — | — | — | — |
| | AVERAGE | — | — | — | — | — | — |

As is clear from table 1, in comparison with the lithium ion secondary batteries of the first and second comparative examples with a conventional structure, the lithium ion secondary battery of the present invention according to the first example has a superior insulation property with the insulating resistance when 100-V voltage was applied for five seconds. Moreover, the lithium ion secondary battery of the first example has a sufficiently high insulating resistance as an insulation property when 500-V voltage was applied for five seconds. As indicated, according to the lithium ion secondary battery (first example) of the present invention, it is confirmed that superior insulation reliability and connection reliability are stably acquired with a simple structure.

INDUSTRIAL APPLICABILITY

The electric energy storage device of the present invention is appropriate for applications, such as an automobile and a two-wheel vehicle with hard vibration.

for an application under a high voltage (e.g., larger than or equal to 100 V used in an application with a voltage of 500 to 1000 V).

The invention claimed is:
1. An electric energy storage device comprising:
a battery element retained in an outer package body having at least a metal layer;
a tabular internal lead connected to the battery element in the outer package body;
a tabular external lead arranged outside the outer package body so as to face the internal lead;
a connection terminal electrically connecting the internal lead and the external lead together;
an internal insulating member provided between the outer package body and the internal lead along an internal surface of the outer package body; and an external insulating member provided between the outer package body and the external lead along an external surface of the outer package body so as to face the internal insulating member, and wherein the connection terminal includes a penetration shaft passing all the way through the external lead, the external insulating member, the outer package body, the internal insulating member, and the internal lead, and flanges integrally formed at both ends of the penetration shaft, the flanges at both ends of the connection terminal depress and sandwich the external insulating member, the outer package body, and the internal insulating member between the tabular external lead and internal lead, and the external insulating member and/or the internal insulating member is pressed in between the penetration shaft of the connection terminal and the metal layer of the outer package body, wherein a through-hole in the tabular external lead through which the penetration shaft of the connection terminal passes is smaller than respective through-holes of the external insulating member and the internal insulating member through which the penetration shaft of the connection terminal passes.

2. The electric energy storage device according to claim 1, wherein the respective through-holes of the external insulating member and the internal insulating member are so formed as to have a substantially equal diameter to a diameter of the penetration shaft, and a through-hole of the outer package body through which the penetration shaft of the connection terminal passes is so formed as to have a larger diameter than the diameter of the penetration shaft beforehand.

3. The electric energy storage device according to claim 1 or 2, wherein the outer package body is a multilayered outer package body further having an internal layer formed of a thermoplastic resin which can be heat-sealed, and the internal insulating member also functions as internal-layer protecting means for suppressing any damage of the internal layer of the multilayered outer package body as the internal insulating member covers at least a part of any one of the battery element, the internal lead, and the connection terminal.

4. The electric energy storage device according to claim 3, wherein the internal insulating member covers an end portion of the internal lead in the vicinity of the internal layer of the multilayered outer package body across a lengthwise direction of the internal lead.

5. The electric energy storage device according to claim 3, wherein the internal insulating member covers the flange of the connection terminal in the vicinity of the internal layer of the multilayered outer package body.

6. The electric energy storage device according claim 3, wherein the internal insulating member has a U-shaped cross-section when viewed in side view, and the U shaped cross-section includes a part along the internal layer of the multilayered outer package body, a part covering the end portion of the internal lead, and a part covering the flange on a leading end of the connection terminal.

7. The electric energy storage device according to claim 1, wherein a plurality of connection terminals are provided for each of the tabular external lead and internal lead.

8. The electric energy storage device according to claim 1, wherein the connection terminal is a rivet joined to each of the tabular external lead and internal lead.

9. The electric energy storage device according to claim 1, wherein the connection terminal is formed of a same material as a material of at least the internal lead.

10. The electric energy storage device according to claim 1, wherein the internal insulating member is formed of polypropylene, polyethylene, polystyrene, polyamide or ionomer having a higher melting point than a melting point of an internal layer which can be heat-sealed.

11. The electric energy storage device according to claim 1, wherein the electric energy storage device is a lithium ion secondary battery used under a high voltage larger than or equal to 100 V.

12. The electric energy storage device according to claim 1, wherein a leading portion of the penetration shaft compresses the tabular external lead against the flange on an upper end of the connection terminal.

13. The electric energy storage device according to claim 2, wherein a lower end of the through-hole of the external insulating member is contiguous with an upper end of the through-hole of the internal insulating member at a position located substantially midway between inner and outer surfaces of the outer body package.

14. An electric energy storage device comprising:

a battery element retained in an outer package body having at least a metal layer;

a tabular internal lead connected to the battery element in the outer package body;

a tabular external lead arranged outside the outer package body so as to face the internal lead;

a connection terminal electrically connecting the internal lead and the external lead together;

an internal insulating member provided between the outer package body and the internal lead along an internal surface of the outer package body; and an external insulating member provided between the outer package body and the external lead along an external surface of the outer package body so as to face the internal insulating member, and wherein the connection terminal includes a penetration shaft passing all the way through the external lead, the external insulating member, the outer package body, the internal insulating member, and the internal lead, and flanges integrally formed at both ends of the penetration shaft, the flanges at both ends of the connection terminal depress and sandwich the external insulating member, the outer package body, and the internal insulating member between the tabular external lead and internal lead, and the external insulating member and/or the internal insulating member is pressed in between the penetration shaft of the connection terminal and the metal layer of the outer package body, wherein respective through-holes of the external insulating member and the internal insulating member through which the penetration shaft of the connection terminal passes are so formed as to have a substantially equal diameter to a diameter of a leading portion of the penetration shaft, wherein a through-hole of the outer package body through which the penetration shaft of the connection terminal passes is so formed as to have a constant diameter along a length thereof that is larger than the diameter of the penetration shaft beforehand, and a lower end of the through-hole of the external insulating member projects downwardly and is contiguous with an upwardly projection upper end of the through-hole of the internal insulating member at a position located substantially midway between inner and outer surfaces of the outer body package.

15. The electric energy storage device according to claim 14, wherein the through-hole in the tabular external lead through which the penetration shaft of the connection terminal passes is smaller than respective through-holes of the external insulating member and the internal insulating member.

16. The electric energy storage device according to claim 14, wherein the internal insulating member has a U-shaped cross-section when viewed in side view, and the U-shaped cross-section includes a part along the internal layer of the multilayered outer package body, a part covering an end portion of the internal lead, and a part covering the flange on a leading end of the connection terminal.

17. An electric energy storage device comprising:

a battery element retained in an outer package body having at least a metal layer;

a tabular internal lead connected to the battery element in the outer package body;

a tabular external lead arranged outside the outer package body so as to face the internal lead;

a connection terminal electrically connecting the internal lead and the external lead together;

an internal insulating member provided between the outer package body and the internal lead along an internal surface of the outer package body; and an external insulating member provided between the outer package body and the external lead along an external surface of the outer package body so as to face the internal insulating member, and wherein the connection terminal includes a penetration shaft passing all the way through the external lead, the external insulating member, the outer package body, the internal insulating member, and the internal lead, and flanges integrally formed at both ends of the penetration shaft, the flanges at both ends of the connection terminal depress and sandwich the external insulating member, the outer package body, and the internal insulating member between the tabular external lead and internal lead, and the external insulating member and/or the internal insulating member is pressed in between the penetration shaft of the connection terminal and the metal layer of the outer package body, wherein the internal insulating member has a U-shaped cross-section when viewed in side view, and the U-shaped cross-section includes a part along the internal layer of the multilayered outer package body, a part covering an end portion of the internal lead, and a part covering the flange on a leading end of the connection terminal.

18. The electric energy storage device according to claim 17, wherein, respective through-holes of the external insulating member and the internal insulating member through which the penetration shaft of the connection terminal passes are so formed as to have a substantially equal diameter to a diameter of the penetration shaft, and a through-hole of the outer package body through which the penetration shaft of the connection terminal passes is so formed as to have a larger diameter than the diameter of the penetration shaft beforehand.

* * * * *